UNITED STATES PATENT OFFICE.

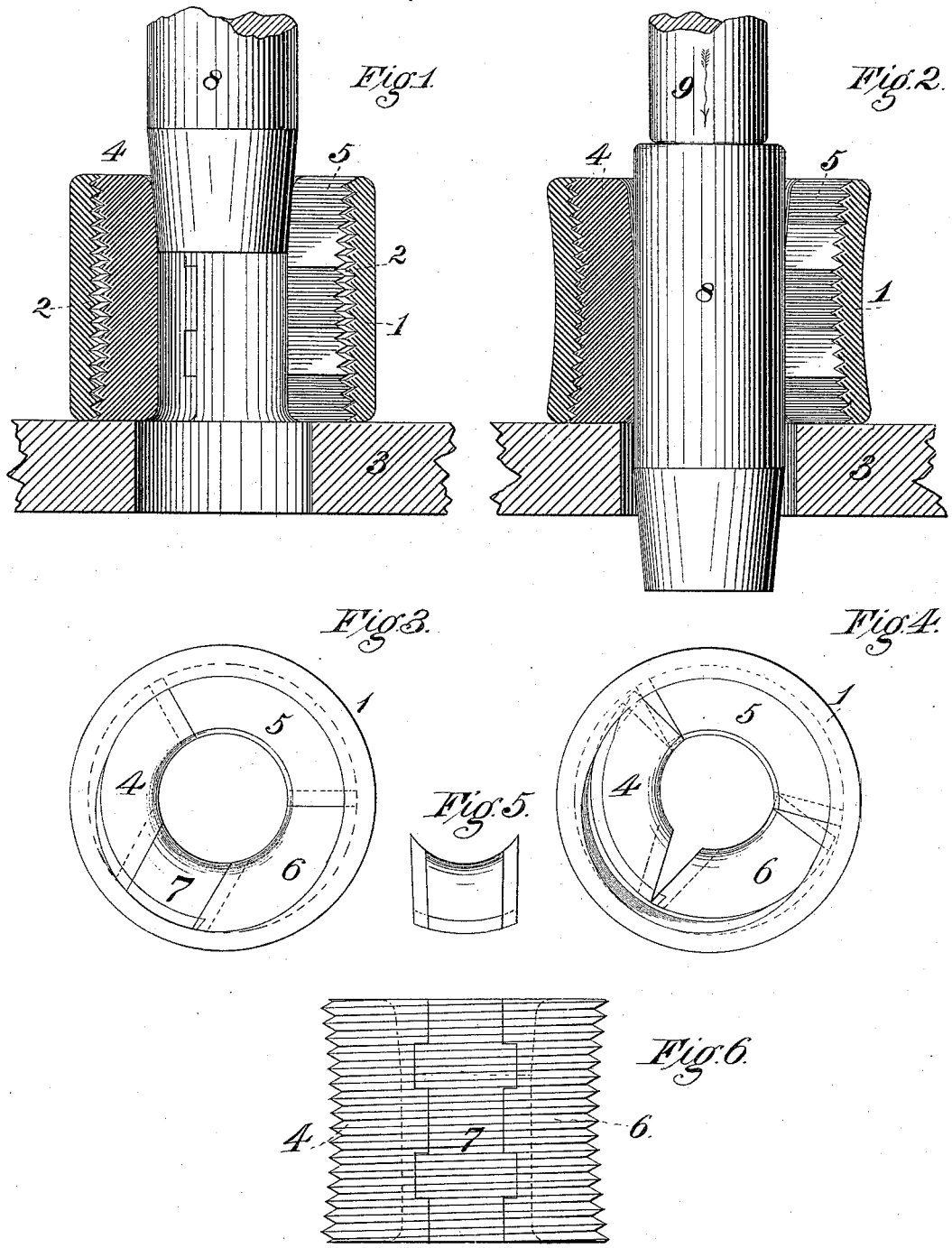

JOSHUA NUTTALL, OF PITTSBURG, PENNSYLVANIA, ASSIGNOR TO HIMSELF AND JOSHUA RHODES, OF SAME PLACE.

COUPLING-EXPANDER.

SPECIFICATION forming part of Letters Patent No. 307,727, dated November 4, 1884.

Application filed May 14, 1884. (Model.)

*To all whom it may concern:*

Be it known that I, JOSHUA NUTTALL, a citizen of the United States, residing at Pittsburg, in the county of Allegheny and State of Pennsylvania, have invented or discovered certain new and useful Improvements in Coupling-Expanders, of which improvements the following is a specification.

In the accompanying drawings, which make part of this specification, Figure 1 is a sectional elevation showing the expanding-ring in place in a coupling ready for operation. Fig. 2 is a similar view, the expanding-ring being forced outwardly by the plunger, which is shown in elevation. Fig. 3 is a plan view of the expanding-ring and coupling, said parts being in the same position as represented in Fig. 2. Fig. 4 is a view similar to Fig. 3, the expanding-ring being shown collapsed for its withdrawal from the coupling. Fig. 5 is a top plan view of key-piece of the expanding-ring. Fig. 6 is a view in side elevation of the expanding-ring.

In constructing pipe-lines for conveying natural gas and other fluids it is necessary that the several sections of pipes should be coupled or united together in as perfect a manner as possible to prevent the escape of the gas. This coupling is usually effected by screwing the threaded ends of the pipe-sections into sockets or sleeves whose interior surfaces are tapered and threaded from each end toward the center, the diameter of the openings at the ends of the sockets being equal to the exterior diameter of the pipe-sections to be inserted therein. These couplings have heretofore been made by first tapping a thread through a sleeve or coupling having its sides parallel. The taper is then formed by enlarging the opening at each end by means of a tapering tap which is inserted at each end, the small end of the tap being of the same size as the opening in the threaded but untapered sleeve. This operation consumes a great deal of time, and a great many sleeves are ruined during the tapering operation, as the threads on the taper tap are liable to cut across the threads previously formed in the sleeve.

The object of my invention is to form these tapering sleeves expeditiously and without loss, and to obviate the use of a tapering tap.

The coupling 1 is forged with straight parallel sides, and on the interior surface thereof are formed the threads 2 by means of what is termed a "straight tap." The sleeve or coupling thus formed is placed on the table 3 of a suitable press, and within the sleeve is placed the expanding-ring, as shown in Fig. 1. This expanding-ring is composed of a series of sections, 4 5 6, and a filling-section or key-piece, 7. These sections are guided and held in proper relation to each other by tenons and mortises formed on the adjacent edges of the sections, as shown, with the exception of the edges of the sections between which the key-piece is adjusted. In those edges mortises are formed, as shown, and the tenons are formed on the edges of the key-piece. By this construction the ring can be contracted into a smaller compass than if the tenons were formed on the edges of the sections and the mortises formed in the key-piece. The outer surface of the sections and key-piece are beveled inwardly toward the middle, as shown, and on its surface are cut threads having a pitch and depth equal to the pitch and depth of the threads formed in the sleeve or coupling.

The sections constructed as described are arranged and adjusted as shown in Fig. 3, the key-piece being omitted. They are then in this collapsed condition placed in the threaded sleeve, and after being adjusted until the threads on the sleeve and ring match the sections are spread out and the key-piece inserted between the sections having adjacent mortised edges. The mandrel 8 is now inserted between the sections, the end of the mandrel and the interior surface of the sections and key being slightly beveled at one end to permit of the insertion of the mandrel, which is forced down and through the ring by the plunger 9 of the press, thereby forcing the sections of the ring outwardly against the sleeve or coupling and causing it to conform with the outer contour of the expanding-ring. After the mandrel has passed through the ring the key is slid inward and removed from between the sections, thereby allowing of the collapse and removal of said sections. The key-piece is wedge-shaped, as shown, in cross-section to permit of its ready insertion and withdrawal from between the sections.

In some cases it may be desirable to expand the coupling or sleeve prior to forming the threads therein, in which case the outer surface of the sections are formed as above described, but are not threaded, the threads being formed in the sleeve after being expanded by means of a tapering tap or other suitable means.

I claim herein as my invention—

1. In a sleeve or coupling expander, the combination of a series of sections having outer surfaces inclined from the center outward, as described, with a mandrel for forcing said sections outwardly, substantially as set forth.

2. In a sleeve or coupling expander, the combination of a series of sections having outer surfaces inclined from the middle outwardly and threaded, as described, with a mandrel for forcing said sections outwardly, substantially as set forth.

3. In a sleeve or coupling expander, the combination of a series of sections having threaded outer surfaces inclined from the center outward, and having their meeting faces mortised and tenoned for guiding and holding the sections in proper relation to each other, with a mandrel for forcing said sections outwardly, substantially as set forth.

In testimony whereof I have hereunto set my hand.

JOSHUA NUTTALL.

Witnesses:
    DARWIN S. WOLCOTT,
    FRANK W. SMITH.